United States Patent [19]

Bertelsen

[11] 4,283,094
[45] Aug. 11, 1981

[54] AIR SUSPENSION SYSTEM FOR VEHICLE TRACK

[76] Inventor: William R. Bertelsen, 2720 31st Ave., Rock Island, Ill. 61201

[21] Appl. No.: 67,652

[22] Filed: Aug. 17, 1979

[51] Int. Cl.³ .............................................. B62D 55/10
[52] U.S. Cl. ...................................... 305/16; 305/25; 305/34; 305/35 EB
[58] Field of Search ..................... 198/811; 305/14, 16, 305/24, 25, 34, 35 EB, 66

[56] References Cited

U.S. PATENT DOCUMENTS

| 809,048 | 1/1906 | Furchtbar | 305/16 |
| 1,612,024 | 12/1926 | Jawbs | 305/35 EB |
| 3,074,499 | 1/1963 | Bertelsen | 305/24 X |
| 3,074,764 | 1/1963 | Bertelsen | 305/34 X |
| 3,261,418 | 7/1966 | Bertin | 305/24 X |

FOREIGN PATENT DOCUMENTS 972395 10/1964 United Kingdom ...................... 305/34

Primary Examiner—David A. Scherbel
Attorney, Agent, or Firm—James T. FitzGibbon

[57] ABSTRACT

An air track device employing an air cushion principle to reduce ground pressure of a vehicle such as a tandem dual, utilizing an endless belt for operative connection to the tandem dual wheels and maintained at a predetermined internal pressure. The endless belt operates in connection with several embodiments of a tubular edge seal for sealing the interior of the chamber defined by the endless belt and for directing a peripheral air jet against a portion of the underside of the belt to create a proximity and lubricating effect.

11 Claims, 15 Drawing Figures

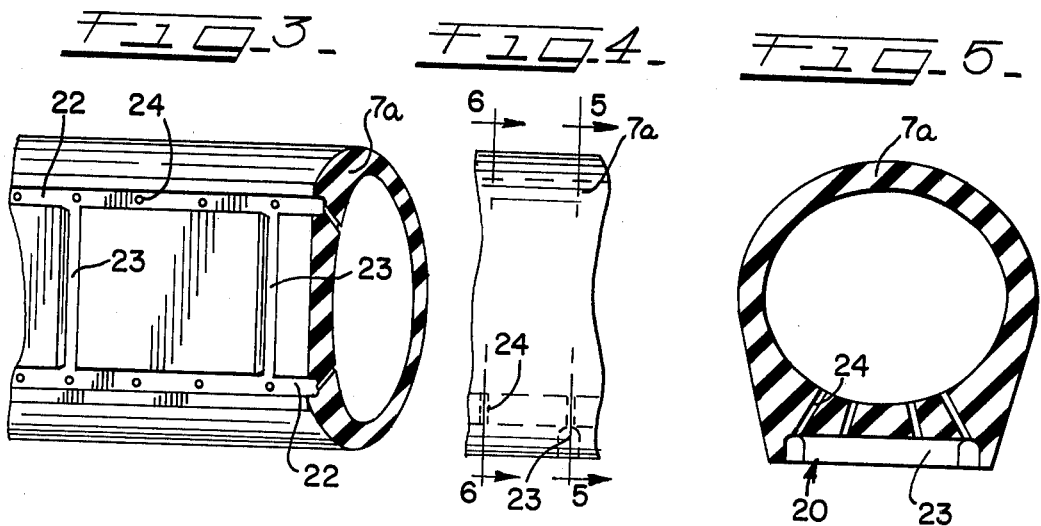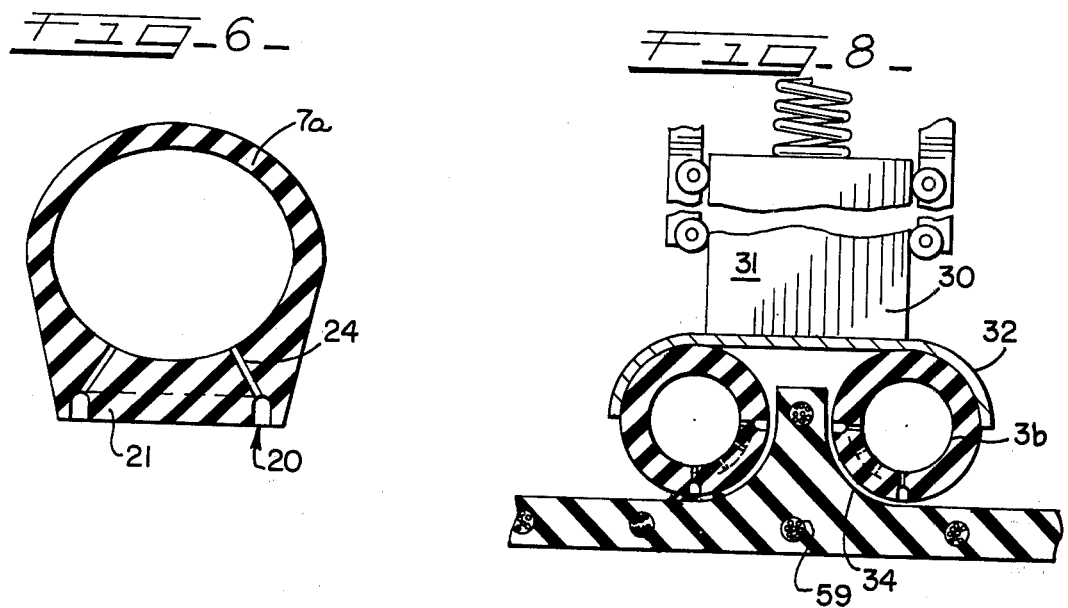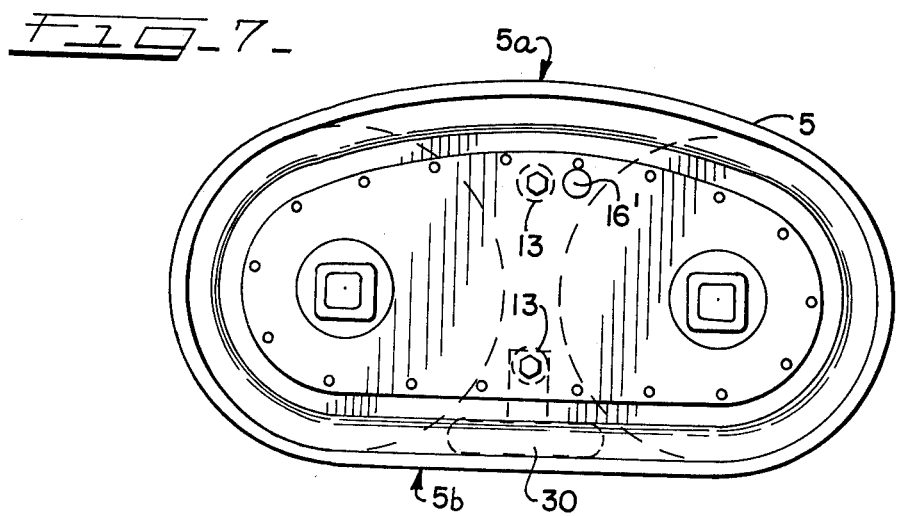

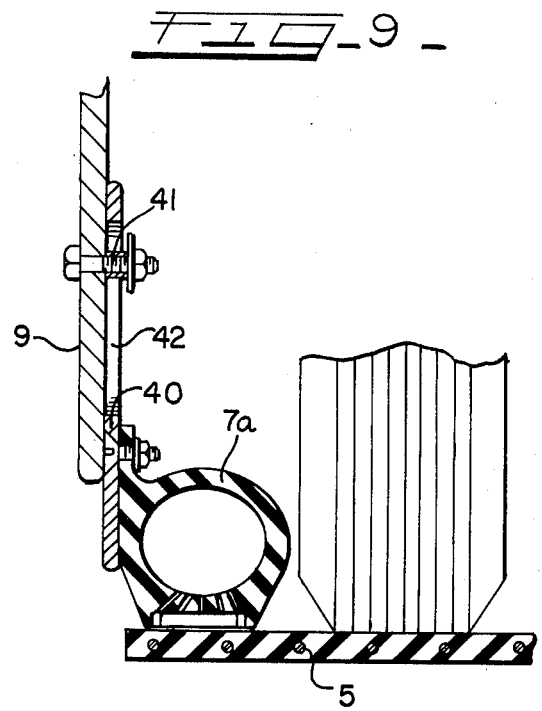
FIG_9_
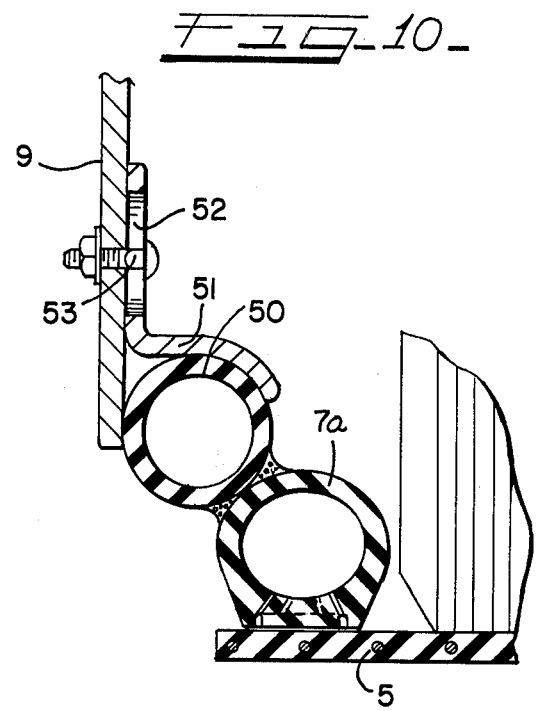
FIG_10_
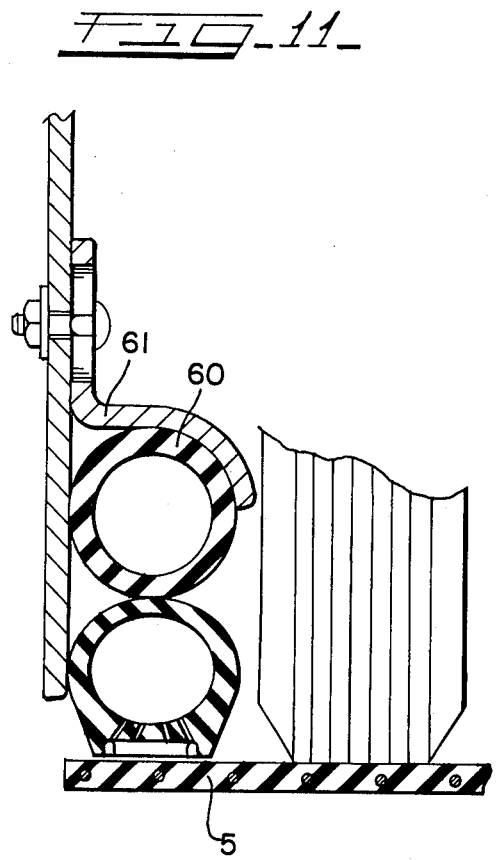
FIG_11_
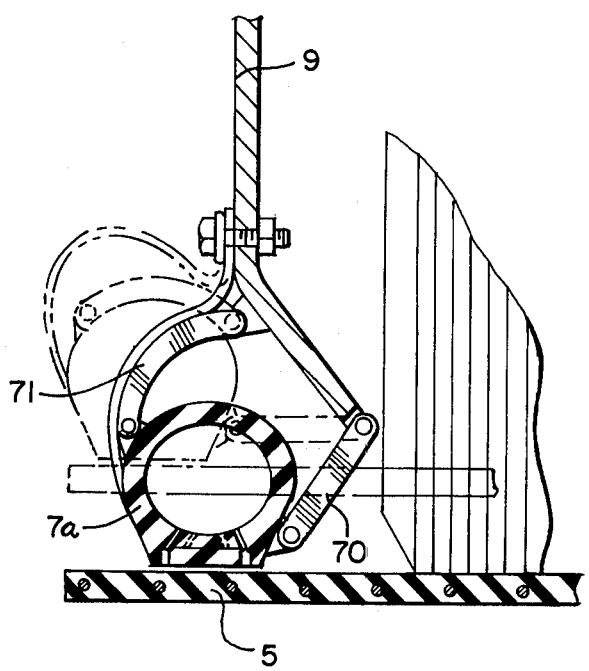
FIG_12_

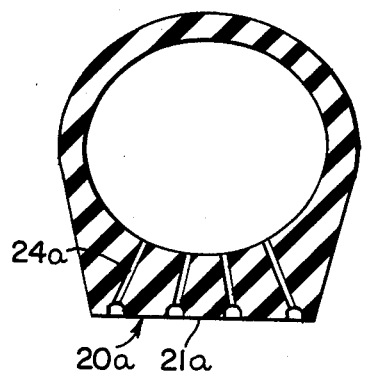
FIG_13
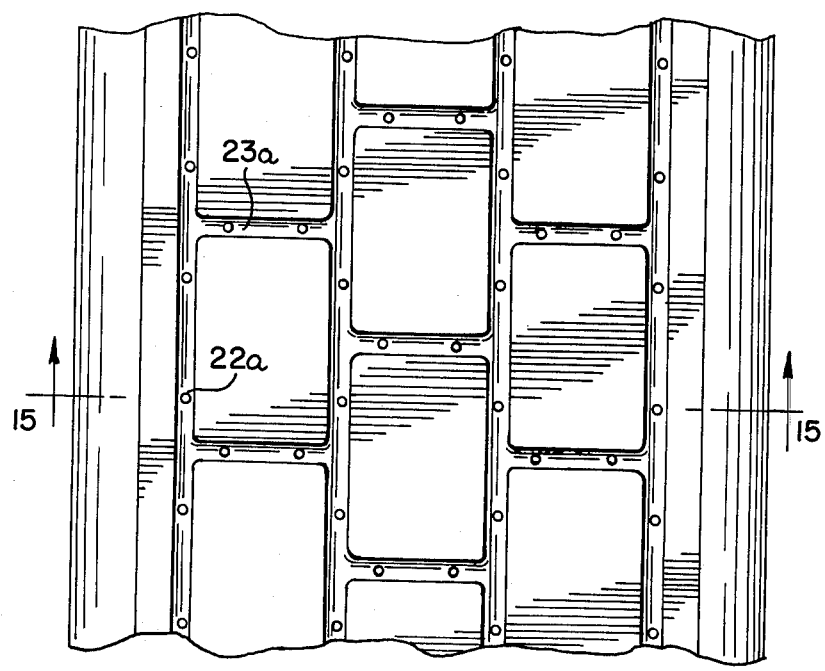
FIG_14
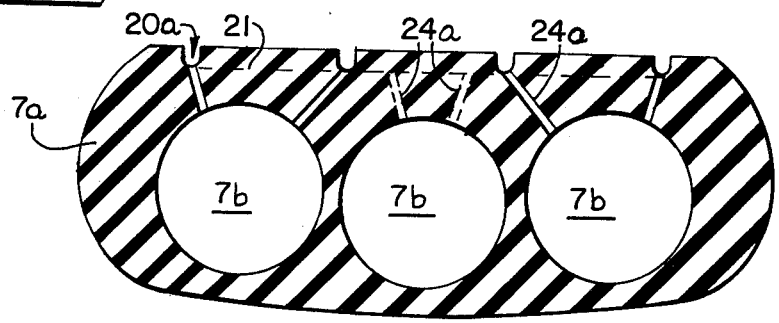
FIG_15

AIR SUSPENSION SYSTEM FOR VEHICLE TRACK

BACKGROUND OF THE INVENTION

This invention relates, in general, to vehicles, and, in particular, to a weight supporting device for a land vehicle.

More specifically, but without restriction to the particular use which is shown and described, this invention relates to an air track apparatus to reduce the unit area loading of highways and the like by vehicles. The air track apparatus herein described is a form of an air cushion device and includes an endless belt means which is operatively coupled to the existing axle and wheels of the vehicle.

Because of frost conditions and the like which are encountered in certain parts of the United States, such as in the Northwest, and in Canada, the load carrying ability of highways and roads is adversely affected. The exposure of the road surfaces to such thermal conditions often necessitates the imposition of regulations to limit the unit area loading imposed by vehicles. Such restrictions are detrimental to the operation of heavy trucks and the like over the highways because such vehicles often exceed these permissible loading levels and can cause damage to the road surface.

In the prior art, several techniques have been employed to overcome the problem of operating trucks and other heavy-duty vehicles over highways subjected to the effects of the frost cycles, or in the case of roadways having low grade surfaces incapable of supporting large loads. One technique has utilized air cushion or ground effect devices by which the wheels of the truck may be partially suspended from contact with the road thereby reducing the loading applied thereto. However, the utilization of a pure air cushion device significantly reduces the ability of an operator to control operation of the vehicle through steering and braking, particularly on slopes, since frictional contact between the vehicle wheels and road surface is drastically reduced. In addition, known air cushion devices require expensive systems capable of generating high levels of air pressure and costly and inconvenient modifications of the vehicle and have yet been satisfactorily employed.

SUMMARY OF THE INVENTION

It is, therefore, an object of this invention to provide an air track employing an air cushion effect to reduce the unit area loading of vehicles upon highways, roads, and the like;

Another object of this invention is to provide an air track employing an air cushion effect to reduce loading with improved control of operation of the vehicle;

A further object of this invention is to reduce loading through the use of an endless track operatively coupled to the wheels of a vehicle;

Still another object of this invention is to provide an improved end seal of a load-reducing endless track which achieves optimum operating characteristics.

Another object of this invention is to employ an air cushion to reduce the pressure applied by the vehicle to the surface while retaining full steering, braking, and propulsion already installed and functional in the vehicle.

These and other objects are attained in accordance with the present invention wherein there is provided an air track device employing an air cushion principle to reduce ground pressure of a vehicle such as a tandem dual. The air track of the invention utilizes an endless belt for operative connection to the tandem dual wheels and is maintained at a predetermined internal pressure. The endless belt operates in connection with tubular seal means which direct a peripheral jet against a portion of the underside of the belt for a proximity and lubricating effect.

DESCRIPTION OF THE DRAWINGS

Further objects of the invention, together with additional features contributing thereto, and advantages accruing therefrom, will be apparent from the following description of several embodiments of the invention which are shown in the accompanying drawings wherein like reference numerals indicate corresponding parts throughout, wherein:

FIG. 3 is a perspective enlarged view, with parts broken away, of a side seal tube of the air track apparatus of FIG. 1;

FIG. 4 is a partial side view of the side seal tube of FIG. 3;

FIG. 5 is a sectional end view taken along line 5—5 of FIG. 4;

FIG. 6 is a sectional end view taken along line 6—6 of FIG. 4;

FIG. 7 is a side schematic view of the air track apparatus of FIG. 1 with a lubricated air bearing to resist lateral loads;

FIG. 8 is a sectional end view of the lubricated air bearing illustrated for use with the air track apparatus in FIG. 7;

FIG. 9 is an end sectional view of another embodiment of the side seal of the air track apparatus of the invention;

FIG. 10 is an end sectional view of still another embodiment of the side seal tube of the air track apparatus of the invention;

FIG. 11 is an end sectional view of another embodiment of the side seal tube of the air track apparatus of the invention;

FIG. 12 is an end sectional view of still another embodiment of the side seal tube of the air track apparatus of the invention;

FIG. 13 is an end sectional view of still another side seal tube of the air track apparatus of the invention;

FIG. 14 is a top schematic illustration of the side seal tube of FIG. 13; and

FIG. 15 is an end sectional view of still another embodiment of the side seal tube of the invention.

DESCRIPTION OF THE PREFERRED EMBODIMENTS OF THE INVENTION

Figure 1:
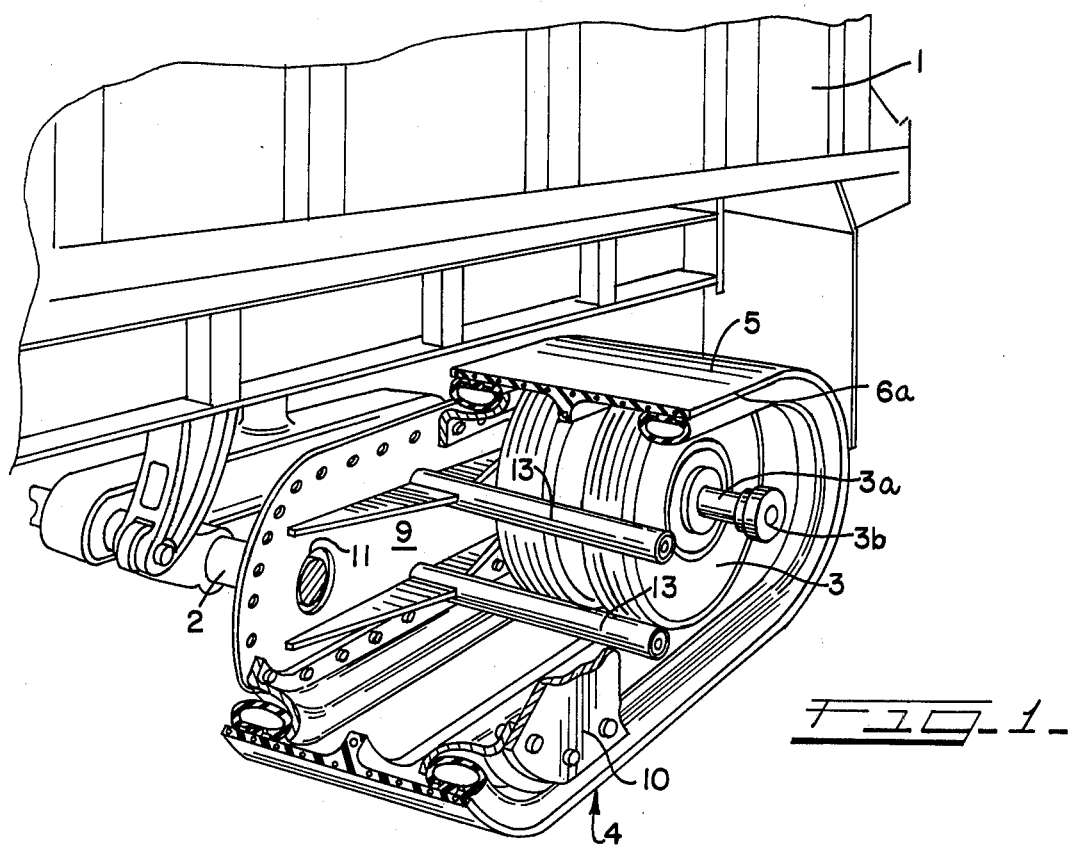
FIG. 1 is a perspective view, with parts broken away, showing the air track apparatus of the invention in operative positions on a dual tandem vehicle.
Figure 2:
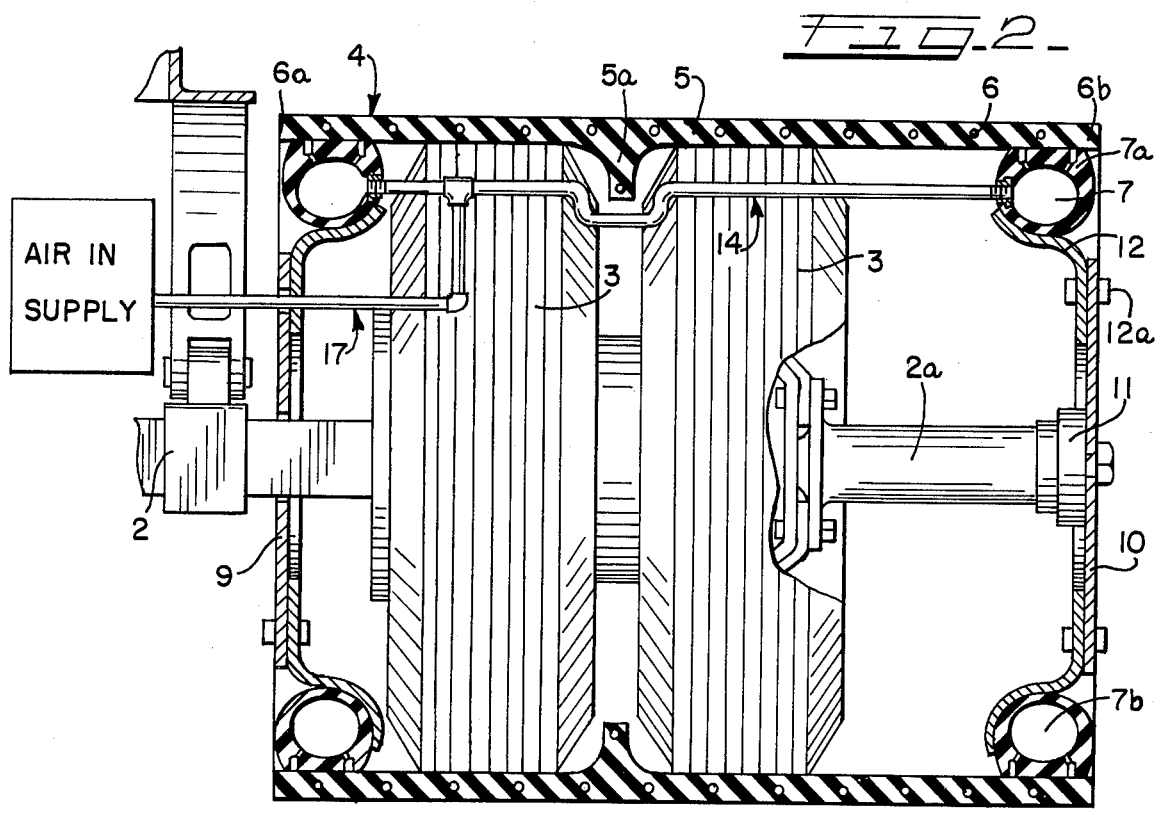
FIG. 2 is an end sectional view of the air track apparatus of FIG. 1.

Referring now to FIGS. 1-6, there is illustrated one embodiment of the air track apparatus of the invention for reducing ground pressure of a vehicle such as a tractor cab having a semi-trailer 1 and is shown mounted in operative position on the tandem axles 2 thereof. The axles 2 support a respective pair of wheels 3 (one of which is shown in FIGS. 1 and 2) carrying tires in which wheels a conventional vehicle brake drum (not shown) is situated.

The air track apparatus of the invention is generally designated by reference numeral 4 and positioned in surrounding relationship to the end of tandem axles 2 about both pairs of tires of wheels 3 on each side of the vehicle. An elongated endless belt or tread 5 constructed from an elastomer material such as, for example, the tread of the tire of wheel 3, is disposed or entrained around the four wheels 3 and its associated tires on each side of vehicle 1 to form a crawler system increasing the area of the load bearing against the road surface. The belt 5 includes a central rib 5a to provide lateral stability by retaining the belt against side forces and maintain it in position. The belt 5 may be strengthened through the utilization of a plurality of cables 6 extending longitudinally through the body of the belt as best shown in FIG. 2.

During operation of vehicle 1, the periphery of the tread of the tires of wheels 3 are in contact with a portion of the smooth inner surface of belt 5 to transmit movement to the belt from the power train of the vehicle, to provide braking action, and the like. The endless tread 5 may include an outer tread design and form a lower run 5a in contact with the road surface and upper run 5b as illustrated in FIG. 7. The configuration of endless tread 5 from the side is flat at the bottom lower run 5a, round at its ends, and curves upward in upper run 5b where no counter pressure is encountered.

The inner and outer edges 6a and 6b of belt 5 are sealed by means of a belt or tread edge sealing system 7 to be described in detail later. The sealing system 7 is respectively supported at inner and outer edges 6a and 6b by means of inner side plate 9 carried by axle 2 and an outer side plate 10 carried by a stub shaft 2a attached to the hub of an outer wheel and coupled to the inside surface of outer plate 10 by bearing 11. The height of inner side plate 9 and outer side plate 10 is less than the diameter or height of the endless belt 5 and side plates 9 and 10 support a respective outer curved member 12 by means of a plurality of bolts 12a and possesses an end portion 12b coupled to a portion of the belt edge sealing system 7. A pair of side bars 13 span the plates 9 and 10 to lend structural integrity to the air track.

The tread edge sealing system 7 includes inner and outer elastomer tubes 7a of soft resilient material having an internal chamber 7b which is pressurized in a manner to be described. Each of the tubes 7a is similar to a tire casing in cross section and is urged toward internal surface of tread 5 in a pressurized condition. The tubes 7a are pressurized through a pressure delivery pipe 14 extending between the inner and outer tubes 7a. Pipe 14 interconnects with a supply pipe 17 which is in fluid communication with an adequate source of air pressure mounted on the vehicle to supply a predetermined pneumatic pressure to chamber 7b within the tubes 7a, such as, for example, 10 p.s.i. or other suitable pressure level. The outer periphery of the tube includes a peripheral air jet system 20 which confronts the smooth inside of the endless belt 5 and produces a proximity effect of a powerful magnitude in conjunction therewith.

The peripheral air jet system 20 is best shown in FIGS. 3-6 and includes an endless chain of peripheral jets 21 to create the proximity effect against belt 5. The chain of jets 21 is in the form of a grid of lateral and longitudinal grooves 22 and 23 which are supplied pressure from chamber 7b through perforations 24. When the peripheral jet system operates to create the proximity effect against belt 5, in theory the belt and the tube 7a never are in physical contact and will be maintained at a very small gap on the order of a millimeter or less of lubricating frictionless air film forming a jet of lubricant air.

The side sealing system 7 substantially seals the gap between the side plates and belt 5 to form a pressurized chamber therein. The air jet produced by side sealing system 7 escapes inwardly and outwardly with the result that the interior of the endless track 5 is pressurized to a certain predetermined level, such as, for example, 10 p.s.i. As should be apparent, such pressurization reduces the concentration or surface pressure of the load of the vehicle against the roadway.

Referring to FIG. 7, there is illustrated a side view of the air track apparatus of the invention, including the provision of a side load bearing which optionally may be utilized in connection with the air track of the invention to resist lateral forces applied to belt 5. The side air bearing 30 is suitably mounted to side bar 13 and includes a spring loaded structure 31. A housing 32 is supported at the lower end of side bearing 30 and is coupled to a pair of spaced tubular members 33 of similar design as air seal tube 7a previously described. The peripheral air jet of member 33 creates a proximity effect against the rib of endless belt 5 having vertical and lateral components.

Referring now to FIG. 9, there is illustrated another embodiment of the air track apparatus of the invention employing a variation by which the tubular seal 7a is mounted by suitable means on vertically sliding member 40. The sliding member 40 is attached by means of a bolt 41 situated within a vertical slot 42 formed in inner side plate 9 whereby the movement of the slideable member permits a squash movement as the vehicle operates of an extent equal to the length of slot 42. It should be apparent that a similar mounting of tubular seal 7a, in conjunction with outer side plate 10 is provided. The pressure introduced into tubular seal 7a creates a proximity effect in connection with the endless belt 5 as previously described.

Referring to FIG. 10, there is illustrated another embodiment of the air track side seal of the invention employing another variation of edge seal whereby a pair of tubular seals 7a and 50 are used. The lower seal 7a is similar to the previously disclosed seals and creates a proximity effect against belt 5. The other tubular seal 50 is an imperforated member attached beneath a curved portion 51 of a slideable member 52 by means of a bolt assembly. The lower portion of tubular seal 50 is attached to lower tubular seal 7a by cement or the like, to produce a squash movement of seals 7a and 50 along with member 52 through a bolt and slot arrangement 53 attaching member 52 to side plate 9. A similar arrangement may be used in conjunction with side plate 10. Both tubes 7a and 50 are to be adapted to be pressurized from a suitable pneumatic source (not shown).

Referring to FIG. 11, there is illustrated still another embodiment of the side sealing system of the invention which is similar to the embodiment of FIG. 10, with the exception that the auxiliary tube 60 is mounted in vertical alignment with the tubular proximity seal 7a and is coupled to a slideable member 61. Squash movement is likewise possible in the embodiment of FIG. 11.

Referring to FIG. 12, there is illustrated still another embodiment of the side seal of the air track of the invention. The embodiment of FIG. 12 includes a proximity producing tubular seal 7a emitting a peripheral jet against the underside of the air track tread 5 and is mounted for movement relative to the side plate 9 by means of a pair of pivoted levers 60 and 61 which permit motion of the tubular member 7a relative to the side plate and wheel for the squash movement as shown in phantom in FIG. 12.

Referring to FIGS. 13 and 14, there is illustrated still another embodiment of the side seal of the air track of the invention. The embodiment of FIGS. 13 and 14 is similar to the side seal shown specifically in FIGS. 3 to 6, with the exception that it is provided with an alternative peripheral air jet system 20a having a chain of peripheral jets 21a to create the proximity effect against belt 5. The chain of jets 21a supplying air through perforations 24a, are in the form of a plurality of parallel longitudinal grooves 22a, pairs of which are interconnected by lateral grooves 23a that are longitudinally offset from the lateral grooves coupling the adjacent pair of longitudinal grooves. Such an arrangement accomplishes a multiple peripheral jet effect.

Referring to FIG. 15, there is illustrated another embodiment of the side seal of the air track of the invention. The embodiment of FIG. 15 is similar to the peripheral air jet system 20a shown in FIG. 14. However, air pressure is supplied to air jet system 20a through perforations 24a provided in a plurality of chambers 7b formed in tube 7a. Each of the chambers 7b may be pressurized by separate pneumatic pressurization sources (not shown) at equal or different pressure levels as desired.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air track apparatus for reducing surface pressure comprising:
   means forming an endless track adapted to be entrained over the wheels of spaced axles of a vehicle to provide an upper and a lower run,
   spaced side members cooperating with said means forming an endless track in providing a chamber,
   pneumatic seal means positioned between said side members and said means forming an endless track to create a seal therebetween,
   air supply means in communication with said seal means to direct pressure to a portion of said seal means thereby forming a pneumatic seal,
   means connecting said air supply with said chamber for pressurization thereof to cause a portion of said lower run into contact with a supporting surface therebeneath,
   pneumatic seal means includes air jet means in communication with said portion for directing a jet of air against said endless track to create a proximity effect,
   said pneumatic seal means includes at least one hollow tubular member,
   said portion of said seal means is a chamber defined by the interior of said hollow tubular member, and
   said air jet means comprises a plurality of aperture means formed through the periphery of the tubular member.

2. The apparatus according to claim 1 wherein said endless track contacts the wheels of the vehicle to create a mechanical coupling therebetween.

3. The apparatus according to claim 1 wherein said means forming an endless track is an endless elastomer belt having an outer tread surface.

4. The apparatus according to claim 3 wherein said belt includes a plurality of reinforcing cables.

5. The apparatus of claim 1 further including an air lubricating bearing means to stabilize side forces applied to the track forming means.

6. The apparatus of claim 5 wherein said air lubricated bearing means is positioned within said chamber to cooperate with an upper portion of the lower run.

7. An air track apparatus for reducing surface pressure comprising:
   means forming an endless track adapted to be entrained over the wheels of spaced axles of a vehicle to provide an upper and a lower run,
   spaced side members cooperating with said means forming an endless track in providing a chamber,
   pneumatic seal means positioned between said side members and said means forming an endless track to create a seal therebetween,
   air supply means in communication with said seal means to direct pressure to a portion of said seal means thereby forming a pneumatic seal,
   means connecting said air supply with said chamber for pressurization thereof to cause a portion of said lower run into contact with a supporting surface therebeneath,
   pneumatic seal means includes air jet means in communication with said portion for directing a jet of air against said endless track to create a proximity effect,
   said pneumatic seal means incudes at least one hollow tubular member,
   said portion of said seal means is a chamber defined by the interior of said hollow tubular member,
   said air jet means comprises a plurality of aperture means formed through the periphery of the tubular member, and
   said aperture means includes a plurality of lateral and longitudinal passages disposed in said tubular member to form a groove network in fluid communication with said chamber.

8. An air track apparatus for reducing surface pressure comprising:
   means forming an endless track adapted to be entrained over the wheels of spaced axles of a vehicle to provide an upper and a lower run,
   spaced side members cooperating with said means forming an endless track in providing a chamber,
   pneumatic seal means positioned between said side members and said means forming an endless track to create a seal therebetween,
   air supply means in communication with said seal means to direct pressure to a portion of said seal means thereby forming a pneumatic seal,
   means connecting said air supply with said chamber for pressurization thereof to cause a portion of said lower run into contact with a supporting surface therebeneath,
   pneumatic seal means includes air jet means in communication with said portion for directing a jet of air against said endless track to create a proximity effect, said pneumatic seal means includes at least one hollow tubular member, said portion of said seal means is a chamber defined by the interior of said hollow tubular member, said air jet means comprises a plurality of aperture means formed through the periphery of the tubular member, and said pneumatic seal means comprises a plurality of hollow tubular members.

9. The apparatus according to claim 8 wherein said pneumatic seal means includes a pair of contacting tubular members mounted adjacent a respective side member.

10. An air track apparatus for reducing surface pressure comprising:
- means forming an endless track adapted to be entrained over the wheels of spaced axles of a vehicle to provide an upper and a lower run,
- spaced side members cooperating with said means forming an endless track in providing a chamber,
- pneumatic seal means positioned between said side members and said means forming an endless track to create a seal therebetween,
- air supply means in communication with said seal means to direct pressure to a portion of said seal means thereby forming a pneumatic seal,
- means connecting said air supply with said chamber for pressurization thereof to cause a portion of said lower run into contact with a supporting surface therebeneath,
- pneumatic seal means includes air jet means in communication with said portion for directing a jet of air against said endless track to create a proximity effect,
- said pneumatic seal means includes at least one hollow tubular member,
- said portion of said seal means is a chamber defined by the interior of said hollow tubular member,
- said air jet means comprises a plurality of aperture means formed through the periphery of the tubular member, and
- said at least one tubular member is mounted for movement relative to a respective side member.

11. The apparatus according to claim 10 wherein said at least one tubular member is mounted for movement relative to a respective side member by pivotally mounted linkage means.

* * * * *